United States Patent Office 3,251,864
Patented May 17, 1966

3,251,864
Δ⁴-PREGNENE-6β,20β-DIOL-3-ONE AND PROCESS FOR THE PRODUCTION THEREOF
Emanuel Kaspar, Berlin-Wilmersdorf, and Klaus Kieslich, Berlin-Charlottenburg, Germany, assignors, by mesne assignments, to Martin Brinkmann Aktiengesellschaft, Bremen, Germany
No Drawing. Filed June 28, 1962, Ser. No. 205,832
Claims priority, application Germany, June 29, 1961, Sch 30,065
11 Claims. (Cl. 260—397.4)

The present invention relates to the production of 6-hydroxyl pregnanes, and more particularly to the production of Δ⁴-pregnene-6β,20β-diol-3-one and allopregnane-20β-3,6-dione, and esters thereof.

In the German patent application Serial No. Sch 29,937 IVb/12o, and the U.S. patent application Serial No. 207,018 of Lange-Sundermann, entitled "Quick Acting Agents Against Amenorrhea," filed simultaneously with this application, there is described the new compounds Δ⁴-pregnene-6β,20β-diol-3-one and allopregnane-20β-3,6-dione, which compounds are effective agents in the treatment of amenorrhea for the promotion of menstrual bleeding, and also as having cytostatic activity. The mentioned application also describes a method of producing these compounds.

It is a primary object of the present invention to provide improved methods of producing these valuable compounds.

It is another object of the present invention to provide improved methods of producing Δ⁴-pregnene-6β,20β-diol-3-one, the isomeric allopregnane-20β-ol-3,6-dione, and physiologically active esters thereof whereby improved yields are obtained, and in addition the advantage is present of using more readily available starting materials than in the above mentioned application.

Other objects and advantages of the present invention will be apparent from a further reading of the specification and of the appended claims.

The method previously described for producing the mentioned compounds comprises the selective oxidation of the 3-position hydroxyl group in Δ⁴-pregnene-3β,6β,20β-triol (which in turn is obtained by the reduction of Δ⁴-pregnene-3β,6β-diol-20-one by means of lithiumaluminumhydride or sodium borohydride) for example by means of manganese dioxide, and then separating the reaction product into the individual components. If desired the hydroxyl derivatives can be converted into the corresponding functionally changed derivative, for example into the acylate.

In accordance with the present invention the Δ⁴-pregnene-6β,20β-diol-3-one (III) and the isomeric allopregnane-20β-ol-3,6-dione (IV) can be produced from the known and easily available Δ⁴-pregnene-20β-ol-3-one (I) by introducing into the 6-position of this compound a hydroxyl group, and the primarily formed hydroxylation product subsequently treated either to separate the same from the allopregnane product or to convert the same into the allopregnane product. The introduction of the 6-position hydroxyl group can be done either biochemically or by pure chemical means.

Thus, the 6-position hydroxyl group can be introduced directly into the molecule of Δ⁴-pregnene-20β-ol-3-one or its 20-ester, whereby in the latter case there is a simultaneous saponification of the ester group, by means of the enzyme of the fungus *Chaetomium funicolum* or *Rhizopus nigricans*.

The introduction of the 6-position hydroxyl group in pure chemical manner can be done by the action of a per acid, particularly mono-perphthalic acid preferably acting on the 20-ester of the Δ⁴-pregnene-20β-ol-3-one which has first been converted in known manner into its enolacylate, thereby forming the corresponding 20-ester of Δ⁴-pregnene-6β,20β-diol-3-one, which can then if desired by treatment for example by means of an alkali such as an alkali hydroxide in alcoholic solution, rearranged into the allopregnane-20β-ol-3,6-dione.

Instead of the above procedure the same enolacylate by treatment with a halogen, particularly with bromine or another bromination agent such as N-bromacetamide can be converted into the corresponding 20-ester of 6-bromo-Δ⁴-pregnene-20β-ol-3-one, which then by treatment with alcoholic-aqueous acids, particularly hydrochloric acid, without isolation as intermediate product of the formed Δ⁴-pregnene-6β,20β-diol-3-one be directly rearranged into the allopregnane-20β-ol-3,6-dione.

It is possible to save the enolacylate step by directly treating the 20-ester of Δ⁴-pregnene-20β-ol-3-one with N-bromosuccinimide so as to convert the same into the 20-ester of 6-bromo-Δ⁴-pregnene-20β-ol-3-one, which can then be rearranged into the allopregnane-20β-ol-3,6-dione as described above.

The methods of production of the present invention are illustrated by the following equations:

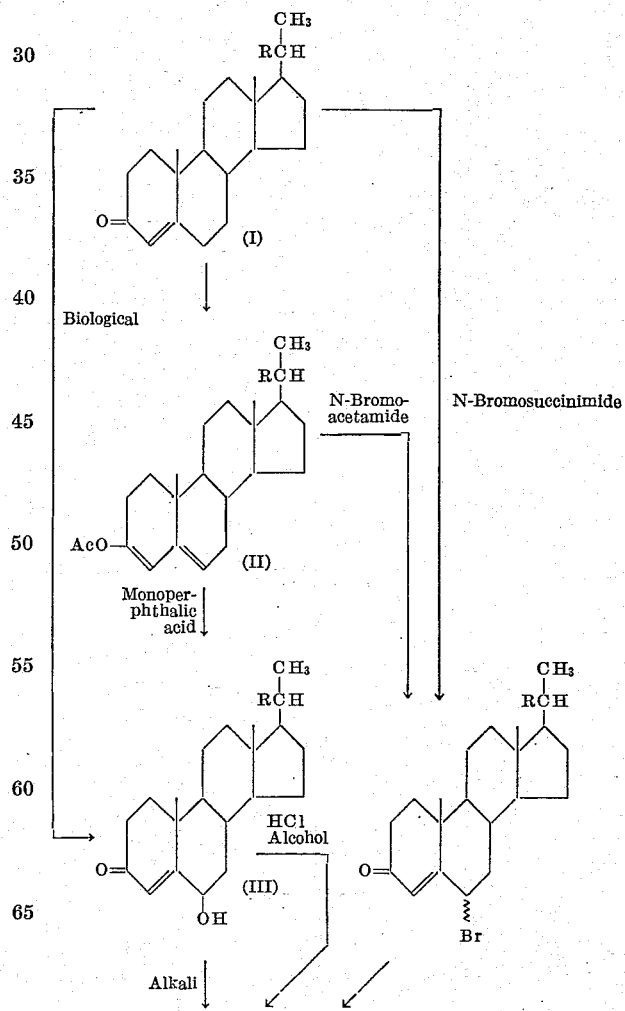

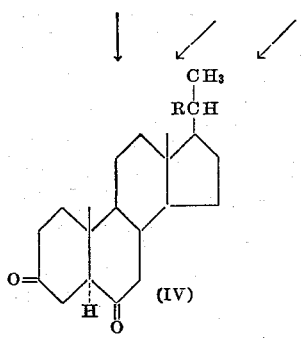

In the above formulas R is βOH or βO-acyl.

The following examples are given to illustrate the present invention. The scope of the invention is not, however, meant to be limited to the specific details of the examples:

EXAMPLE 1

40.46 g. of $\Delta^4$-pregnene-20β-ol-3-one in 1,210 cc. of acetic acid anhydride with 40.46 g. of p-toluene sulfonic acid is allowed to stand under nitrogen at room temperature for 16 hours with initial stirring. The entire reaction mass is then carefully stirred into ice water, the solid precipitate is filtered off under suction and dried. Upon recrystallization from methanol there is obtained 31.3 g. of $\Delta^{3,5}$-pregnadiene-3,20β-diol-diacetate having a melting point of 108–116° C. Further recrystallization from methanol with carbon results in a melting point of 120–124° C.

An ice cold solution of 16.5 g. of N-bromacetamide, 15.0 g. of sodium acetate, 16.5 cc. of acetic acid and 300 cc. of water are added dropwise to 15.75 g. of the obtained enolacetate in 1,725 cc. of acetone under cooling with ice. The reaction mixture is then removed from the ice bath, allowed to stand for 3 hours at room temperature and concentrated under vacuum to dryness. The obtained crude 6-bromo-$\Delta^4$-pregnene-20β-ol-3-one-20-acetate is heated under nitrogen to refluxing for 4 hours in 1,980 cc. of ethanol and 198 cc. of concentrated hydrochloric acid. The volume is thereafter concentrated to about 1/3 under vacuum, the reaction mixture is stirred into ice water, the resulting precipitate is filtered off under suction, washed with water and dried.

After recrystallization from ethyl acetate (with carbon) there is obtained 5α-pregnane-20β-ol-3,6-dione having a melting point of 225–229° C. Repeated recrystallization from methyl isobutyl ketone results in a melting point of 229–231° C.

$[\alpha]_D^{25°} -25°$ (CHCl$_3$)

The total yield of the chromatography of the mother liquor over silica gel which contains 10% water, with methylenechloride-carbon tetrachloride (3:1) is 4.1 g. The substance is found to be identical with the substance produced in other manner.

EXAMPLE 2

6.0 g. N-bromosuccinimide are added to 5.0 g. of $\Delta^4$-pregnene-20β-ol-3-one-20-acetate in 250 cc. of dry carbon tetrachloride and the mixture is heated for 1 hour under refluxing. After filtration and concentration to dryness the obtained crude 6-bromo-$\Delta^4$-pregnene-20β-ol-3-one-20-acetate is further treated as in Example 1. The thus produced 5α-pregnene-20β-ol-3,6-dione after chromatography over silica gel and recrystallization from methyl isobutyl ketone melts at 229–231° C.

EXAMPLE 3

A solution of 4.0 g. of $\Delta^4$-pregnene-20β-ol-3-one in 200 cc. of dry benzene and 40 cc. of isopropenyl-acetate, which contains 1.2 g. of p-toluenesulfonic acid-monohydrate, is heated for 4 hours with slow distillation, whereby after the first 2 hours an additional 20 cc. is added to the reaction mixture. Ice water is then added to the reaction mixture, the same is then shaken out with methylene chloride, the solution is washed with sodium bicarbonate and water, dried and evaporated to dryness. A sample is recrystallized from methanol and found to melt at 120–124° C. The thus obtained crude $\Delta^{3,5}$-pregnadiene-3,20β-diol-diacetate is then allowed to stand with 1.3 equivalents of monoperphthalic acid in 400 cc. of ether for about 72 hours. After normal working up and chromatography on neutral aluminum oxide there is obtained the $\Delta^4$-pregnene-6β,20β-diol-3-one-20-acetate.

UV 29$\epsilon_{236}$=13,000

EXAMPLE 4

A solution of 100 mg. of $\Delta^4$-pregnene-6β,20β-diol-3-one-20-acetate in 20 cc. of methanol is mixed with 1.0 g. of potassium hydroxide dissolved in 2 cc. of water and heated under refluxing for 1 hour. After cooling the solution is neutralized with acetic acid, diluted with water and shaken in normal manner with methylene chloride and further worked up. After evaporation of the solvent the remaining residue is recrystallized from methylisobutyl ketone. The thus obtained 5α-pregnane-3β-ol-3,6-dione melts at 228–230° C. The yield is 73 mg.

EXAMPLE 5

300 mg. of 5α-pregnane-20β-ol-3,6-dione is heated on a steam bath with 1.2 cc. of pyridine and 0.6 cc. of acetic acid anhydride for 1½ hours. After cooling, careful stirring into ice water, filtration under suction and washing with water the remaining precipitate is recrystallized from methanol and the resulting 5α-pregnane-20β-ol-3,6-dione-20-acetate melts at 200–201.5° C. The yield was 200 mg.

EXAMPLE 6

6β-hydroxylation of 4-pregnene-20β-ol-3,20-dione (A) WITH *CHAETOMIUM FUNICOLUM*

A fermenter of stainless steel having a capacity of 50 liters is charged with 30 liters of a nutrient solution of:

| | Percent |
|---|---|
| Yeast extract | 0.5 |
| Cornsteep liquor | 0.5 |
| Glucose | 2.0 | adjusted to pH 7.0, sterilized by heating for 40 minutes at 120° C., and after solution inoculated with a spore suspension of *Chaetomium funicolum*, which is obtained by rinsing a 5-day corn culture (15 g. corn) with about 100 cc. of physiological saline solution.

After 48 hours of growth at 28° C. under stirring (220 revolutions per minute) and airing (1.65 m.³/hour) 1.8 liters of the obtained culture is removed under sterile conditions and transferred into a 50 liter fermenter containing 28.2 liters of a nutrient solution of the same composition and sterilized as above.

After 16 hours of growth time, 7.5 g. of $\Delta^4$-pregnene-20β-ol-3-one in 150 cc. of ethanol is added thereto under sterile conditions. The fermentation time is checked by paper chromatographic analysis of samples and amounts to about 48–64 hours.

The fermentation broth is filtered by means of a suction filter and the filtrate is extracted three times, each time with 10 liters of methylisobutyl ketone. The extract is concentrated in a vacuum evaporator. The oily residue is subjected to chromatography on silica gel.

About 1 g. of the oily starting material is eluated with methylene chloride-chloroform (1:1). The chloroform eluate and the chloroform-ethyl acetate eluate contains about 5 g. of the crude 6β-hydroxy compound which is recrystallized from acetone-petroleum ether. 3.8 g. of the pure product (50% of the theoretical) are obtained. The melting point is 186.5–189° C.

$\epsilon_{236}$=13,600

(B) WITH *RHIZOPUS NIGRICANS*

30 liters of a nutriet solution of:

3.5% malt extract
    3.0% glucose
    0.65% NaCl
    0.15% peptone
    0.018% $K_2HPO_4$ and
    0.009% $MgSO_4$ are introduced into a 50 liter fermenter and inoculated with *Rhizopus nigricans* and developed under the same technical conditions as in (A) above. After 24 hours 15 g. of $\Delta^4$-pregnene-20β-ol-3-one in 200 cc. of ethanol are added to the culture and further fermented for an additional 24 hours.

After further working up as described under (A) above the oily crude product is subjected to chromatography on silica gel.

About 1 g. of the reacted material is eluated with chloroform. The amount of pure product obtained is 0.69 g.

The chloroform-ethyl acetate (4:1) eluate yields 1.6 g. (10%) of the 6β-hydroxy compound after recrystallization from methylene chloride. The melting point is 183–187° C.

The chloroform-ethyl acetate (2:1) to (1:1) eluate yields the 11α-hydroxy compound from which small amounts of the 6β,11α-dihydroxy compound are eluated with ethyl acetate.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method which comprises reacting the enolacetate form of the 20-ester of $\Delta^4$-pregnene-20β-ol-3-one with an organic peroxy acid, thereby introducing a hydroxyl group into the 6-position of said compound.

2. The method which comprises reacting the enolacetate form of the 20-ester of $\Delta^4$-pregnene-20β-ol-3-one with monoperphthalic acid, thereby introducing a hydroxyl group into the 6-position of said compound.

3. The method which comprises reacting the enolacetate form of the 20-ester of $\Delta^4$-pregnene-20β-ol-3-one with a bromination agent, thereby introducing a bromine into the 6-position of said compound; and reacting the thus formed 6-bromo compound with an acid, thereby forming allopregnane-20β-ol-3,6-dione.

4. The method which comprises reacting the enolacetate form of the 20-ester of $\Delta^4$-pregnene-20β-ol-3-one with a bromination agent, thereby introducing a bromine into the 6-position of said compound; and reacting the thus formed 6-bromo compound with alcoholic hydrochloric acid, thereby forming allopregnane-20β-ol-3,6-dione.

5. The method which comprises reacting the enolacetate form of the 20-ester of $\Delta^4$-pregnene-20β-ol-3-one with N-bromacetamide, thereby introducing a bromine into the 6-position of said compound; and reacting the thus formed 6-bromo compound with an acid, thereby forming allopregnane-20β-ol-3,6-dione.

6. The method which comprises reacting the enolacetate form of the 20-ester of $\Delta^4$-pregnene-20β-ol-3-one with N-bromacetamide, thereby introducing a bromine into the 6-position of said compound; and reacting the thus formed 6-bromo compound with alcoholic hydrochloric acid, thereby forming allopregnane-20β-ol-3,6-dione.

7. A method which comprises reacting the 20-acylate of $\Delta^4$-pregnene-20β-ol-3-one with N-bromosuccinimide, thereby introducing bromine into the 6-position; and reacting the thus formed 6-bromo compound with an acid, thereby forming allopregnane-20β-ol-3,6-dione.

8. A method which comprises reacting the 20-acylate of $\Delta^4$-pregnene-20β-ol-3-one with N-bromosuccinimide, thereby introducing bromine into the 6-position; and reacting the thus formed 6-bromo compound with alcoholic hydrochloric acid, thereby forming allopregnane-20β-ol-3,6-dione.

9. The 20-acetate of 6-bromo-$\Delta^4$-pregnene-20β-ol-3-one.

10. $\Delta^{3,5}$-pregnadiene-3,20β-diol-3,20-diacetate.

11. $\Delta^4$-pregnene-6β,20β-diol-3-one-20-acetate.

References Cited by the Examiner
UNITED STATES PATENTS

| | | | |
|---|---|---|---|
| 2,658,023 | 11/1953 | Shull et al. | 195—51 |
| 2,819,264 | 1/1958 | Gould et al. | 260—239.55 |
| 2,831,798 | 4/1958 | McAleer et al. | 195—51 |
| 2,870,141 | 1/1959 | Campbell et al. | 260—239.5 |
| 2,870,174 | 1/1959 | Djerassi | 260—397.4 |
| 2,876,238 | 3/1959 | Graber et al. | 260—397.45 |
| 2,887,499 | 5/1959 | Carvajal | 260—397.45 |

LEWIS GOTTS, *Primary Examiner.*

MORRIS LIEBMAN, *Examiner.*